US010167949B2

(12) United States Patent
Murakami et al.

(10) Patent No.: US 10,167,949 B2
(45) Date of Patent: Jan. 1, 2019

(54) CONTROL DEVICE OF VEHICLE POWER TRANSMISSION DEVICE

(71) Applicant: TOYOTA JIDOSHA KABUSHIKI KAISHA, Toyota-shi, Aichi-ken (JP)

(72) Inventors: Yuki Murakami, Toyota (JP); Masakazu Owatari, Nagakute (JP); Tomohiro Asami, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/801,960

(22) Filed: Nov. 2, 2017

(65) Prior Publication Data
US 2018/0135746 A1 May 17, 2018

(30) Foreign Application Priority Data

Nov. 15, 2016 (JP) .................................. 2016-222791

(51) Int. Cl.
*F16H 61/12* (2010.01)
(52) U.S. Cl.
CPC ..... *F16H 61/12* (2013.01); *F16H 2061/1264* (2013.01)
(58) Field of Classification Search
CPC .......................... F16H 61/12; F16H 2061/1264
USPC .......... 701/34.4, 60, 67, 68; 477/65; 475/65; 74/731.1
See application file for complete search history.

(56) References Cited

U.S. PATENT DOCUMENTS

| 5,611,749 A * | 3/1997 | Jang ................... F16H 61/0021 475/65 |
| 2014/0025269 A1* | 1/2014 | Ayabe ..................... F16H 61/12 701/60 |

FOREIGN PATENT DOCUMENTS

JP 2010-038205 A 2/2010

* cited by examiner

Primary Examiner — Marthe Y Marc-Coleman
(74) Attorney, Agent, or Firm — Oliff PLC

(57) ABSTRACT

A control device of a vehicle power transmission device for the vehicle power transmission device including a line pressure regulating device regulating a hydraulic pressure of a hydraulic fluid discharged from an oil pump to a predetermined line pressure while changing an opening area of a discharge flow passage, and an automatic transmission having a predetermined gear position established by engagement of a hydraulic friction engagement element by using the line pressure as a source pressure, the control device comprising: an abnormality determination portion configured to detect a slip of the hydraulic friction engagement element establishing the predetermined gear position at the time of establishment of the predetermined gear position and, if an input torque at the time of occurrence of the slip is equal to or greater than an abnormality determination value defined in advance based on a torque transmittable at a minimum line pressure by the hydraulic friction engagement element establishing the predetermined gear position, to make an abnormality determination indicative of a possibility of an abnormality causing the output hydraulic pressure of the line pressure regulating device to be the minimum line pressure while the opening area of the discharge flow passage is maximized, the abnormality determination value being defined in accordance with a rotation speed of the oil pump such that the abnormality determination value becomes larger when the rotation speed is high as compared to when the rotation speed is low.

8 Claims, 6 Drawing Sheets

|  | C1 | C2 | C3 | C4 | B1 | B2in | B2out |
|---|---|---|---|---|---|---|---|
| 1st | O | O |  |  |  | O | O |
| 2nd | O |  |  |  |  | O | O |
| 3rd |  | O |  |  |  | O | O |
| 4th |  |  |  | O |  | O | O |
| 5th |  | O |  | O | O |  |  |
| 6th | O |  |  | O | O |  |  |
| 7th | O |  | O | O |  |  |  |
| 8th |  |  | O | O | O |  |  |
| 9th | O |  | O |  | O |  |  |
| 10th |  | O | O |  | O |  |  |

(O : ENGAGED)

CONTROL DEVICE OF VEHICLE POWER TRANSMISSION DEVICE

INCORPORATION BY REFERENCE

The disclosure of Japanese Patent Application No. 2016-222791 filed on Nov. 15, 2016 including the specification, drawings and abstract is incorporated herein by reference in its entirety.

TECHNICAL FIELD

The present invention relates to a control device of a vehicle power transmission device and particularly to a technique of improving an accuracy of abnormality determination of a line pressure regulating device.

BACKGROUND ART

In the case of a slip of a hydraulic friction engagement element engaged by using a line pressure as a source pressure to establish a predetermined gear position of an automatic transmission, it is required to determine whether the slip is caused by a line pressure regulating device, so as to identify a failure component. Therefore, for a vehicle power transmission device including (a) a line pressure regulating device that regulates a hydraulic pressure of a hydraulic fluid discharged from an oil pump to a line pressure and that may become unable to perform the regulation and cause an abnormality resulting in output of a minimum line pressure and (b) an automatic transmission having a predetermined gear position established by engagement of a hydraulic friction engagement element based on the line pressure, a control device is proposed that has (c) an abnormality determination portion detecting a slip of the hydraulic friction engagement element establishing the predetermined gear position at the time of establishment of the predetermined gear position and, if an input torque at the time of occurrence of the slip is equal to or greater than an abnormality determination value defined in advance based on a torque transmittable at the minimum line pressure by the hydraulic friction engagement element establishing the predetermined gear position, making an abnormality determination indicative of a possibility of an abnormality causing the output hydraulic pressure of the line pressure regulating device to be the minimum line pressure (see Patent Document 1). A device known as the line pressure regulating device is a device that performs a regulation of a hydraulic pressure of a hydraulic fluid to a predetermined line pressure while changing an opening area of a discharge flow passage and that may become unable to perform the regulation and cause an abnormality resulting in output of the minimum line pressure while the opening area of the discharge flow passage is maximized.

PRIOR ART DOCUMENT

Patent Document

Patent Document 1: Japanese Laid-Open Patent Publication No. 2010-38205

SUMMARY OF THE INVENTION

Problem to be Solved by the Invention

However, in the case of the abnormality resulting in output of the minimum line pressure while the opening area of the discharge flow passage is maximized, when a rotation speed of an oil pump becomes higher and a discharge flow rate increases, the minimum line pressure is raised due to a flow resistance etc. of the discharge flow passage as the discharge flow rate increases, although an abnormality determination value is conventionally defined based on the minimum value of the minimum line pressure so as to reliably make an abnormality determination. Therefore, the abnormality determination may be made, particularly in a high rotation speed region of the oil pump, even though the line pressure regulating device has no possibility of abnormality, causing a problem that a time is required until a failure component can be identified.

The present invention was conceived in view of the situations and it is therefore an object of the present invention to allow a determination to be made with high accuracy in terms of an abnormality causing the output hydraulic pressure of the line pressure regulating device to be the minimum line pressure because the opening area of the discharge flow passage is maximized.

Solution to Problem

To achieve the above object, a first aspect of the invention provides a control device of a vehicle power transmission device for the vehicle power transmission device including (a) a line pressure regulating device regulating a hydraulic pressure of a hydraulic fluid discharged from an oil pump to a predetermined line pressure while changing an opening area of a discharge flow passage, and (b) an automatic transmission having a predetermined gear position established by engagement of a hydraulic friction engagement element by using the line pressure as a source pressure, (c) the control device comprising an abnormality determination portion detecting a slip of the hydraulic friction engagement element establishing the predetermined gear position at the time of establishment of the predetermined gear position and, if an input torque at the time of occurrence of the slip is equal to or greater than an abnormality determination value defined in advance based on a torque transmittable at a minimum line pressure by the hydraulic friction engagement element establishing the predetermined gear position, making an abnormality determination indicative of a possibility of an abnormality causing the output hydraulic pressure of the line pressure regulating device to be the minimum line pressure while the opening area of the discharge flow passage is maximized, wherein (d) the abnormality determination value is defined in accordance with a rotation speed of the oil pump such that the abnormality determination value becomes larger when the rotation speed is high as compared to when the rotation speed is low.

A second aspect of the invention provides the control device of a vehicle power transmission device according to the first aspect of the invention, wherein (a) the automatic transmission includes a shift control electromagnetic valve controlling a hydraulic pressure supplied to the hydraulic friction engagement element, and wherein. (b) if the input torque at the time of occurrence of the slip is lower than the abnormality determination value, the abnormality determination portion makes an abnormality determination indicative of a possibility of an abnormality interrupting the supply of the hydraulic pressure to the hydraulic friction engagement element due to a failure of the shift control electromagnetic valve.

A third aspect of the invention provides the control device of a vehicle power transmission device according to the first or second aspect of the invention, wherein (a) the control device comprises a normality determination portion making a normality determination indicating that the line pressure regulating device is normal when no slip is detected in the hydraulic friction engagement element establishing the predetermined gear position even when an input torque is equal to or greater than a normality determination value defined in advance based on a torque transmittable at the minimum line pressure by the hydraulic friction engagement element establishing the predetermined gear position at the time of establishment of the predetermined gear position, wherein (b) the normality determination value is defined in accordance with a rotation speed of the oil pump such that the normality determination value becomes larger when the rotation speed is high as compared to when the rotation speed is low, and wherein (c) the normality determination value is set to a value larger than a determination reference value corresponding to an input torque value transmittable at the minimum line pressure by the hydraulic friction engagement element establishing the predetermined gear position, while the abnormality determination value is set to a value smaller than the determination reference value.

A fourth aspect of the invention provides the control device of a vehicle power transmission device according to any one of the first to third aspects of the invention, wherein (a) the automatic transmission includes a plurality of hydraulic friction engagement elements engaged by using the line pressure as a source pressure and establishes each of a plurality of gear positions different in transmission ratio in accordance with a difference in combination of engagement and release states of the plurality of hydraulic friction engagement elements, and wherein (b) the abnormality determination value is defined separately for each of the plurality of gear positions.

Advantageous Effects of the Invention

According to the vehicle power transmission device as described above, based on the fact that when the discharge flow rate of the hydraulic fluid is increased in accordance with a rise in the rotation speed of the oil pump at the time of abnormality causing the output hydraulic pressure of the line pressure regulating device to be the minimum line pressure, the minimum line pressure tends to become higher as the discharge flow rate increases, the abnormality determination value is defined in accordance with the rotation speed of the oil pump such that the value becomes larger when the rotation speed of the oil pump is high as compared to when the rotation speed of the oil pump is low, so that the abnormality determination of the line pressure regulating device is properly made in accordance with a change in the minimum line pressure associated with the change in the rotation speed of the oil pump, and therefore, the determination accuracy is improved.

The second aspect of the invention corresponds to the case that the automatic transmission includes a shift control electromagnetic valve controlling a hydraulic pressure supplied to the hydraulic friction engagement element and may cause an abnormality interrupting a supply of the hydraulic pressure to the hydraulic friction engagement element due to a failure of the shift control electromagnetic valve, and when the input torque at the time of occurrence of the slip is lower than the abnormality determination value, the abnormality determination is made for the shift control electromagnetic valve. Therefore, by defining the abnormality determination value in accordance with the rotation speed of the oil pump, the abnormality determination of the line pressure regulating device is properly excluded, which facilitates the identification of abnormal components including the shift control electromagnetic valve.

The third aspect of the invention corresponds to the case that the normality determination of the line pressure regulating device is made if no slip is detected in the hydraulic friction engagement element even when the input torque is equal to or greater than the predefined normality determination value and, since the normality determination value is defined in accordance with the rotation speed of the oil pump, the normality determination of the line pressure regulating device is properly made regardless of a change in the minimum line pressure associated with a change in the rotation speed of the oil pump, so that the determination accuracy is improved. Since a value larger than the determination reference value corresponding to the input torque value transmittable at the minimum line pressure is set as the normality determination value and a value smaller than the determination reference value is set as the abnormality determination value, it is prevented that the normality determination is made even though the line pressure regulating device is not normal or that the abnormality determination is not made even though the line pressure regulating device has a possibility of abnormality, when variations occur in the normality determination value and the abnormality determination value or in the input torque value due to dimensional errors and aging variations of portions, detection errors of sensors, fluctuations in rotation speed, etc., so that the normality determination and the abnormality determination are made with high accuracy.

The fourth aspect of the invention corresponds to the case that the automatic transmission is capable of establishing a plurality of gear positions with a plurality of hydraulic friction engagement elements and, since the abnormality determination value is set separately for each of the plurality of gear positions, the abnormality determination of the line pressure regulating device is properly made regardless of differences in torque characteristics (such as the number and areas of friction materials and the pressure receiving areas and diameter dimensions of hydraulic actuators) of the individual hydraulic friction engagement elements.

MODES FOR CARRYING OUT THE INVENTION

Figure 1:
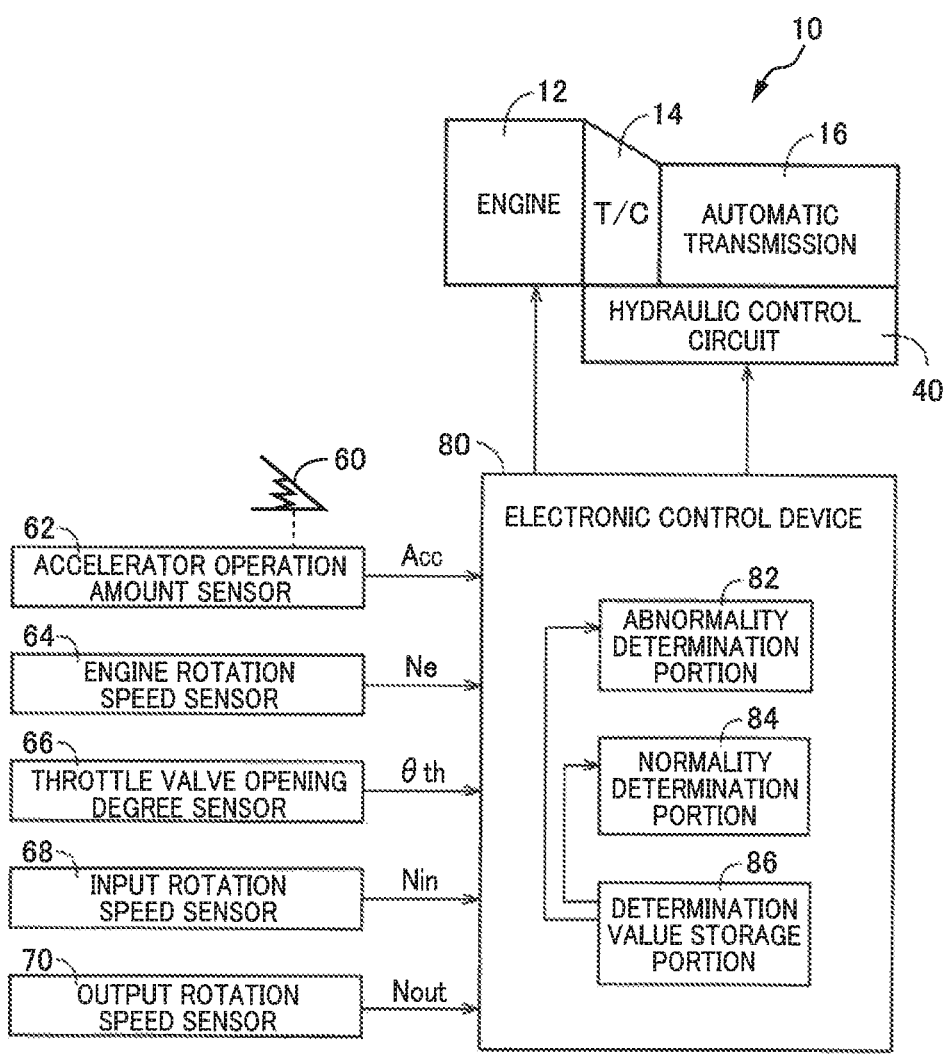
FIG. 1 is a schematic of a vehicle power transmission device to which the present invention is preferably applied.

An oil pump is coupled to a drive source for running or a power transmission path, for example, and mechanically rotationally driven, although an electric pump rotationally driven by an electric motor can be adopted. In the case of a mechanical oil pump, the pump can directly be coupled to an output shaft of the drive source for running etc. or can be connected via a transmission gear etc. The drive source for running may be an engine that is an internal combustion engine such as a gasoline engine and a diesel engine, or may be an electric motor. Both the engine and the electric motor may be included as the drive source for running.

A line pressure regulating device includes, for example, an electromagnetic pressure regulating valve such as a linear solenoid valve capable of regulating an output pressure (signal pressure) through electric control, and a hydraulic control valve such as a regulator valve to which the signal pressure is supplied, and is configured to have a spool of the hydraulic control valve biased in accordance with the signal pressure so as to output a line pressure corresponding to the signal pressure while changing an opening area of a discharge flow passage due to an axial movement of the spool. The line pressure regulating device can be configured to output the line pressure directly from the electromagnetic pressure regulating valve. Various line pressure regulating devices can be adopted that cause an abnormality resulting in an output hydraulic pressure set to a minimum line pressure because the opening area of the discharge flow passage is maximized.

A suitable automatic transmission is a multi-speed transmission of a planetary gear type etc. capable of establishing a plurality of gear positions different in transmission ratio with a plurality of hydraulic friction engagement elements; however, the automatic transmission may be a forward/backward switching device switching forward and backward running or may be a transmission having only two high and low speeds changed by a single hydraulic friction engagement element, and other various automatic transmissions including hydraulic friction engagement elements can be adopted. For the hydraulic friction engagement elements, single-plate or multi-plate clutches and brakes engaged by hydraulic cylinders or belt-type brakes are preferably used.

A suitable shift control electromagnetic valve controlling a hydraulic pressure supplied to the hydraulic friction engagement elements is an electromagnetic pressure regulating valve such as a linear solenoid valve capable of regulating the supply pressure through electric control, for example. A slip of the hydraulic friction engagement elements due to a failure of this shift control electromagnetic valve or the line pressure regulating device can be determined from a deviation between an actual transmission ratio that is a ratio of the input rotation speed to the output rotation speed of the automatic transmission and a theoretical transmission ratio when the hydraulic friction engagement elements are completely engaged, and can be determined based on the input rotation speed, the output rotation speed, and the theoretical transmission ratio, or can also be determined from a difference in rotation speed between rotating members on both sides of the hydraulic friction engagement elements and a change in rotation speed (rotational acceleration) of portions, for example.

For an abnormality determination value for making an abnormality determination of the line pressure regulating device, for example, an input torque value (determination reference value) obtained from the torque transmittable by the hydraulic friction engagement elements at the minimum line pressure can directly be used; however, desirably, considering dimensional errors and aging variations of portions, detection errors of sensors, fluctuations in rotation speed of the oil pump, etc., the abnormality determination value is set to a value smaller than the determination reference value by multiplying the determination reference value by a predetermined safety factor (e.g., a value of about 0.8 to 0.9 smaller than 1.0) or subtracting a predetermined value from the determination reference value. For a normality determination value for making a normality determination of the line pressure regulating device, for example, the determination reference value can directly be used; however, desirably, considering dimensional errors and aging variations of portions, detection errors of sensors, fluctuations in rotation speed of the oil pump, etc., the normality determination value is set to a value larger than the determination reference value by multiplying the determination reference value by a predetermined safety factor (e.g., a value of about 1.1 to 1.2 larger than 1.0) or adding a predetermined value to the determination reference value. Various setting methods can be used such as setting the normality determination value by adding a constant value to the abnormality determination value and setting the abnormality determination value by subtracting a constant value from the normality determination value. These abnormality and normality determination values are determined by a map, an arithmetic expression, etc., using the rotation speed of the oil pump as a parameter, for example. When the oil pump is mechanically rotationally driven by the drive source for running etc., the rotation speed of the rotational drive source such as an engine rotation speed corresponding to the rotation speed of the oil pump can be defined as a parameter. Since the minimum line pressure continuously varies in accordance with a change in the rotation speed of the oil pump, it is desirable that the abnormality determination value and the normality determination value are also continuously changed in accordance with the rotation speed; however, the values may be changed by one stage or two or more multiple stages in accordance with the rotation speed or may approximately be changed like a polygonal line.

The abnormality determination indicative of a possibility of abnormality in the line pressure regulating device may include a possibility of abnormality of other components in a hydraulic circuit and, when no other component has an abnormality as a result of various abnormality determinations, the abnormality determination may be made to indicate that the line pressure regulating device has an abnormality. The same applies to the abnormality determination of the shift control electromagnetic valve.

Although the abnormality determination of the shift control electromagnetic valve is made in the second aspect of the invention and the normality determination of the line pressure regulating device is made in the third aspect of the invention, only the abnormality determination of the line pressure regulating device may be made in the case of implementing the first aspect of the invention.

EXAMPLES

Examples of the present invention will now be described in detail with reference to the drawings. In the following examples, the figures are simplified or deformed as needed for description and portions are not necessarily precisely drawn in terms of dimension ratio, shape, etc.

Figures 2, 3:
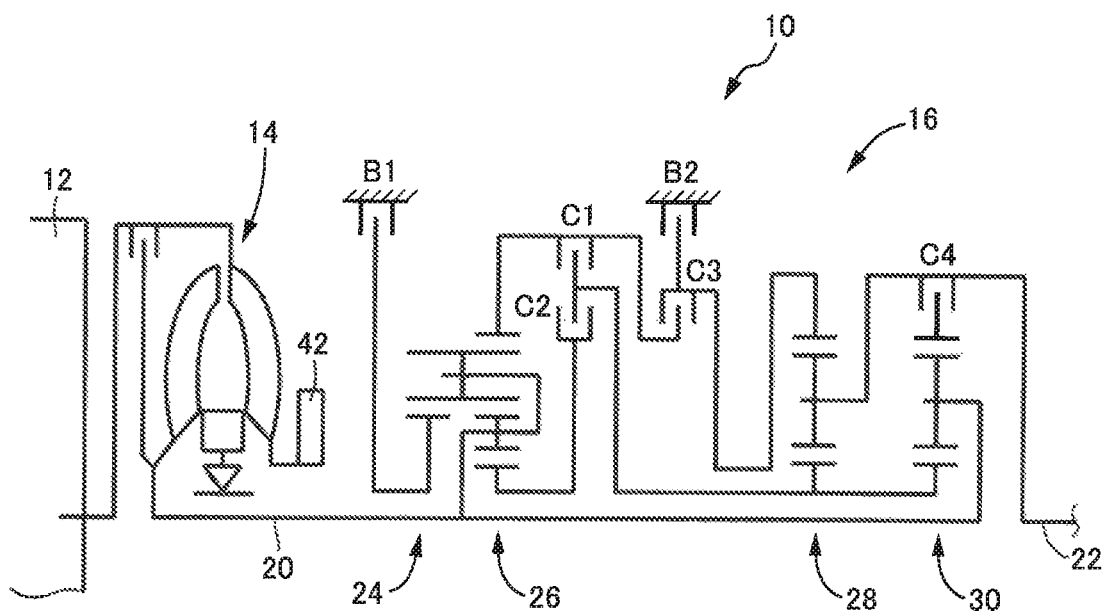
FIG. 2 is a skeleton diagram for specifically explaining an example of a power transmission mechanism of the vehicle power transmission device shown in FIG. 1.
FIG. 3 is a diagram of an operation table for explaining a relationship between a plurality of forward gear positions of an automatic transmission of FIG. 2 and an engagement/release state of friction engagement elements.

FIG. 1 is a schematic for explaining a vehicle power transmission device 10 to which the present invention is preferably applied, and an output of an engine 12 made up of an internal combustion engine such as a gasoline engine and a diesel engine goes through a torque converter (T/C) 14 and an automatic transmission 16 and is transmitted from a final reduction gear to drive wheels (not shown). FIG. 2 is a skeleton diagram for specifically explaining an example of a power transmission mechanism of the vehicle power transmission device 10, which is of a vertical mounting type preferably used in FR (front-engine rear-drive) vehicles. The engine 12 is a drive source for running, the torque converter 14 is a fluid coupling, and a mechanical oil pump 42 is connected to a pump impeller of the torque converter 14.

The automatic transmission 16 changes a speed of rotation of an input shaft 20 coupled to a turbine shaft of the torque converter 14 in multiple stages and outputs the rotation from an output shaft 22, and includes a total of four planetary gear devices, which are a single pinion type first planetary gear device 24, a double pinion type second planetary gear device 26, a single pinion type third planetary gear device 28, and a single pinion type fourth planetary gear device 30. The first planetary gear device 24 and the second planetary gear device 26 constitute a so-called Ravigneaux type planetary gear train. This automatic transmission 16 also includes four clutches C1 to C4 and two brakes B1, B2 (hereinafter simply referred to as clutches C and brakes B if not particularly distinguished), and these clutches C and brakes B are individually controlled to be engaged and disengaged as shown in an operation table of FIG. 3 such that ten forward speed gear positions (a first speed gear position "1st" to a tenth speed gear position "10th") different in transmission ratio (transmission gear ratio) γ (=input rotation speed Nin/output rotation speed Nout) are established in accordance with a combination of the engagement/release states thereof. The input rotation speed Nin is the rotation speed of the input shaft 20, the output rotation speed Nout is the rotation speed of the output shaft 22, and the output rotation speed Nout corresponds to a vehicle speed V. "B2in" and "B2out" in the operation table of FIG. 3 are a pair of hydraulic actuators disposed on the brake B2, and the brake B2 is controlled to be engaged and released by both of the hydraulic actuators B2in and B2out.

Figure 4:
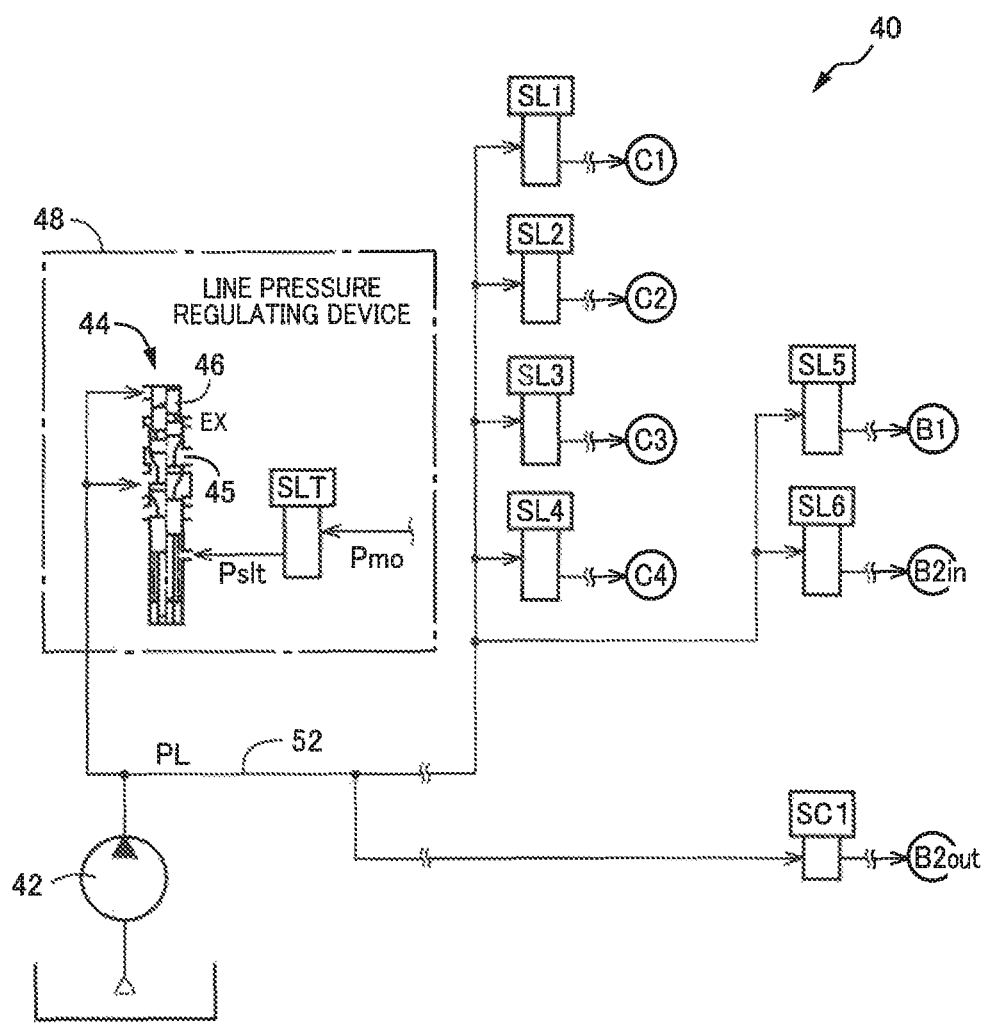
FIG. 4 is a circuit diagram for explaining an example of a hydraulic control circuit included in the vehicle power transmission device of FIG. 1.

The clutches C1 to C4 and the brakes B1, B2 are hydraulic friction engagement elements such as multi-plate clutches and brakes engaged by hydraulic actuators and are respectively controlled to be engaged and released by a hydraulic control circuit 40 shown in FIG. 4 so as to establish the ten forward speed gear positions shown in FIG. 3. The hydraulic control circuit 40 includes the oil pump 42 rotationally driven by the engine 12 as well as a primary regulator valve 44, linear solenoid valves SLT, SL1 to SL6, an on-off solenoid valve SC1, etc., and the hydraulic fluid pumped by the oil pump 42 is first regulated to a predetermined line pressure PL by the primary regulator valve 44. The linear solenoid valve SLT is connected to the primary regulator valve 44 and the linear solenoid valve SLT is electrically controlled by an electronic control device 80 (see FIG. 1) so as to output a signal pressure Pslt by using a modulator hydraulic pressure Pmo, which is a substantially constant pressure, as a source pressure. When the signal pressure Pslt is supplied to the primary regulator valve 44, a spool 46 of the primary regulator valve 44 is biased by the signal pressure Pslt, and the spool 46 is axially moved while changing an opening area of a discharge flow passage 45, so that the line pressure PL is regulated in accordance with the signal pressure Pslt. This line pressure PL is regulated in accordance with an accelerator operation amount Acc that is an output request amount, for example. The linear solenoid valve SLT is an electromagnetic pressure regulating valve for line pressure regulation, and the primary regulator valve 44 is a hydraulic control valve regulating the line pressure PL in accordance with the signal pressure Pslt supplied from the linear solenoid valve SLT. At the time of failure due to snapping of a wire, a valve stick (defective operation due to clogging with foreign matter), etc. of the linear solenoid valve SLT, the spool 46 may be moved to a descending end of FIG. 4 at which the opening area of the discharge flow passage 45 is maximized and a predetermined minimum line pressure PLmin may be output. In this example, a line pressure regulating device 48 is formed, including the primary regulator valve 44, the linear solenoid valve SLT, etc.

The hydraulic fluid is regulated by the line pressure regulating device 48 at the line pressure PL, and is supplied through a supply oil passage 52 to the linear solenoid valves SL1 to SL6, the on-off solenoid valve SC1, etc. The linear solenoid valves SL to SL6 and the on-off solenoid valve SC1 are arranged so as to correspond to the respective hydraulic actuators of the clutches C1 to C4 and the brakes B1, B2 and, when the output hydraulic pressures of the valves are respectively controlled in accordance with a control signal from the electronic control device 80, the clutches C1 to C4 and the brakes B1, B2 are individually controlled to be engaged and released so that any of the gear positions from the first speed gear position "1st" to the tenth speed gear position "10th" is established. The linear solenoid valves SL1 to SL6 are electromagnetic pressure regulating valves while the on-off solenoid valve SC1 is an electromagnetic on-off valve, and all these valves correspond to the shift control electromagnetic valves switching the gear position of the automatic transmission 16. The linear solenoid valves SL1 to SL6 and the on-off solenoid valve SC1 are all normally-closed (N/C) type valves and, at the time of failure due to the snapping etc., the supply of hydraulic pressure to the respective hydraulic actuator is interrupted, which makes respective one of the clutches C1 to C4 and the brakes B1, B2 unable to be engaged, so that a slip occurs.

Returning to FIG. 1, the electronic control device 80 includes a so-called microcomputer including a CPU, a RAM, a ROM, an I/O interface, etc., and executes a signal process in accordance with a program stored in advance in the ROM, while utilizing a temporary storage function of the RAM. The electronic control device 80 functions through this signal process as a controller providing the output control of the engine 12, the shift control of the automatic transmission 16, etc., and is configured separately for the engine output control, the shift control, etc., as needed. The electronic control device 80 is supplied with a signal indicative of an operation amount (i.e., accelerator operation amount) Acc of an accelerator pedal 60 from an accelerator operation amount sensor 62. The accelerator operation amount Acc corresponds to a driver's output request amount. Additionally, from an engine rotation speed sensor 64 detecting a rotation speed (i.e., engine rotation speed) Ne of the engine 12, a throttle valve opening degree sensor 66 detecting an opening degree (i.e., throttle valve opening degree) θth of an electronic throttle valve of the engine 12, an input rotation speed sensor 68 detecting the input rotation speed Nin, an output rotation speed sensor 70 detecting the output rotation speed Nout corresponding to the vehicle speed V, etc., the electronic control device 80 is supplied with various pieces of information necessary for various types of control, such as the engine rotation speed Ne, the throttle valve opening degree θth, the input rotation speed Nin, and the output rotation speed Nout.

The electronic control device 80 also functionally includes an abnormality determination portion 82 and a normality determination portion 84. The abnormality determination portion 82 executes a signal process in accordance with steps S1 to S4 (hereinafter simply referred to as S1 to S4) of a flowchart shown in FIG. 5 to make an abnormality determination indicative of a possibility of abnormality in the linear solenoid valve SLT for line pressure regulation and an abnormality determination indicative of a possibility of abnormality in the shift control electromagnetic valves, i.e., the linear solenoid valves SL1 to SL6 (hereinafter simply referred to as linear solenoid valves SL if not particularly distinguished) and the on-off solenoid valve SC1.

Figure 5:
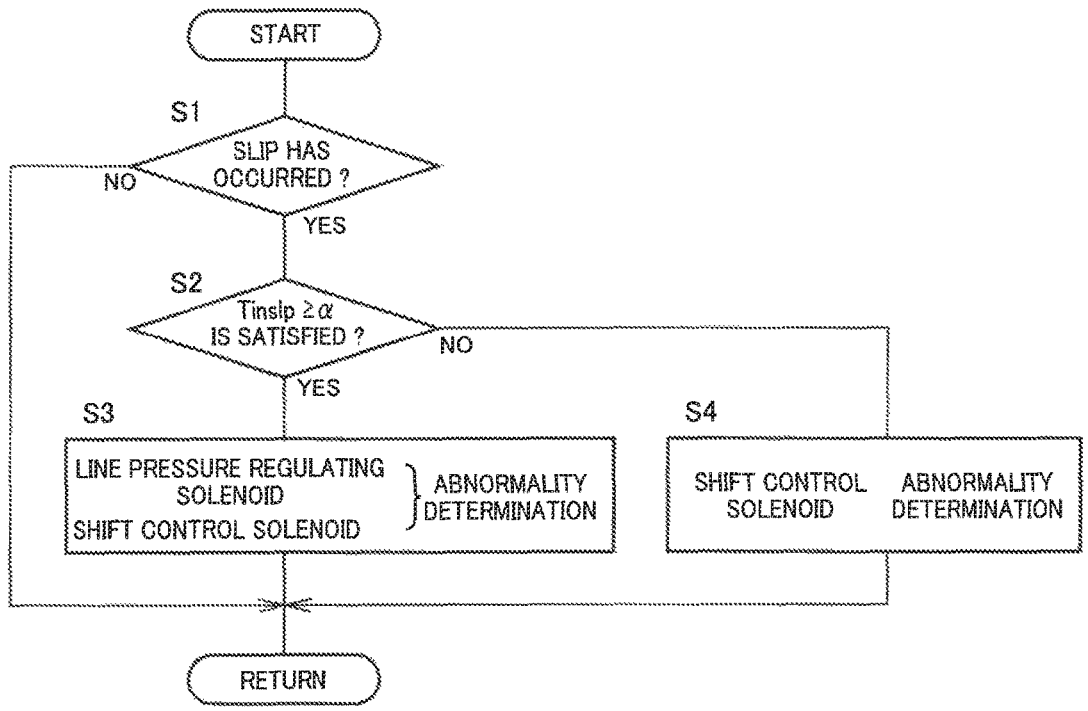
FIG. 5 is a flowchart for specifically explaining an operation of an abnormality determination portion functionally included in an electronic control device of FIG. 1.

Operation described by the flowchart of FIG. 5 is executed when a predefined determination execution condition is satisfied, such as when the automatic transmission 16 is kept at any of the forward gear positions and the driving running is performed with the accelerator pedal 60 depressed. At S1, it is determined whether a slip has occurred in any of the clutches C and the brakes B for establishing the current gear position. Specifically, when any of the clutch(es) C and the brake(s) B to be engaged are completely engaged, a value (Nout*γr) obtained by multiplying the output rotation speed Nout by a theoretical transmission ratio γr of the current gear position substantially matches the actual input rotation speed Nin and, therefore, the determination can be made in accordance with following Equation (1). In particular, if the input rotation speed Nin is equal to or greater than a value (Nout*γr+X) acquired by adding a margin value X to the value obtained by multiplying the output rotation speed Nout by the theoretical transmission ratio γr of the current gear position, it can be determined that a slip has occurred, and S2 and subsequent steps are executed. When Equation (1) is not satisfied, it is determined that no slip has occurred, and the process is simply terminated.

$$Nin \geq Nout*\gamma r+X \quad (1)$$

At S2, it is determined whether an input torque Tinslp at the time of occurrence of the slip is equal to or greater than a predefined abnormality determination value α and, in the case of Tinslp≥α, S3 is executed to make an abnormality determination, or in the case of Tinslp<α, S4 is executed to make an abnormality determination. The input torque Tinslp is the torque of the input shaft 20 and can be calculated from the throttle valve opening degree θth of the engine 12, the engine rotation speed Ne, and the torque ratio of the torque converter 14, for example. The abnormality determination value α is defined as a value smaller than a determination reference value S by multiplying the determination reference value S by a predetermined safety factor (e.g., about 0.8 to 0.9), and the determination reference value S (see FIG. 7) is a value of an input torque Tin calculated from the torque transmittable by the clutch(es) C and/or the brake(s) B for establishing the current gear position at the minimum line pressure PLmin if the line pressure PL is set to the minimum line pressure PLmin because of an interruption of conduction of an excitation current to a solenoid of the linear solenoid valve SLT of the line pressure regulating device 48 due to the snapping or because of a valve stick etc. The determination reference value S can be obtained by calculation from the minimum line pressure PLmin and the specifications of the portions or may be obtained by simulations, experiments, etc. Since the torques transmittable at the minimum line pressure PLmin by the clutch(es) C and the brake(s) B differ from each other depending on the respective torque characteristics of the clutches C and the brakes B, i.e., the numbers of friction materials, the pressure receiving areas and the diameter dimensions of the hydraulic actuators, etc., and the clutch(es) C and the brake(s) B to be engaged are different for each of the gear positions, the abnormality determination value α is set separately for each of the gear positions.

At S3, the abnormality determination is made to indicate a possibility of abnormality in both a line pressure regulating solenoid and a shift control solenoid, and at S4, the abnormality determination is made to indicate a possibility of abnormality only in the shift control solenoid. The line pressure regulating solenoid is the solenoid of the linear solenoid valve SLT of the line pressure regulating device 48 and may cause an abnormality causing the line pressure PL to be the minimum line pressure PLmin because the opening area of the discharge flow passage 45 of the primary regulator valve 44 is maximized in the case of the interruption of conduction of the excitation current due to the snapping etc., and therefore, if the slip has occurred at the input torque Tinslp equal to or greater than the abnormality determination value α, the abnormality causing the line pressure PL to be the minimum line pressure PLmin is possibly caused due to a failure of the linear solenoid valve SLT. The shift control solenoid is a solenoid of any of the linear solenoid valves SL or the on-off solenoid valve SC1 controlling the hydraulic pressure of the clutches C and the brakes B, and the abnormality determination in this case is made on the linear solenoid valve SL and the on-off solenoid valve SC1 involved in the establishment of the current gear position. In particular, the interruption of conduction of the excitation current to the linear solenoid valve SL and the on-off solenoid valve SC1 due to the snapping etc., causes an abnormality interrupting a supply of hydraulic pressure to the hydraulic actuators of the clutch C and the brake B and, therefore, if the slip has occurred regardless of whether the input torque Tinslp is equal to or greater than the abnormality determination value α, the abnormality interrupting a supply of hydraulic pressure to the hydraulic actuators of the clutch C and the brake B is possibly caused due to the snapping etc., of the linear solenoid valve SL and the on-off solenoid valve SC1 involved in the current gear position. If the abnormality determination of the line pressure regulating solenoid is made, for example, the output of the engine 12 serving as the drive source for running is limited for fail-safe and, if the abnormality determination of the shift control solenoid is made, for example, the use of the gear position using the corresponding hydraulic friction engagement elements (the clutch(es) C and the brake(s) B) is inhibited for fail-safe.

Figure 7:
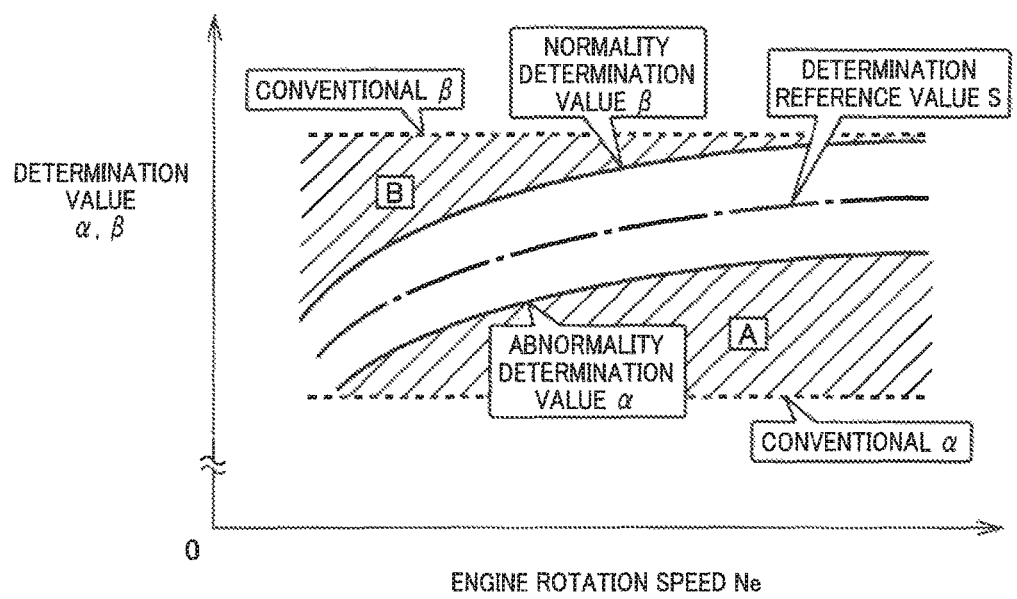
FIG. 7 is a diagram for explaining an example of an abnormality determination value $\alpha$ and a normality determination value $\beta$ used in the flowcharts of FIGS. 5 and 6.
Figure 8:
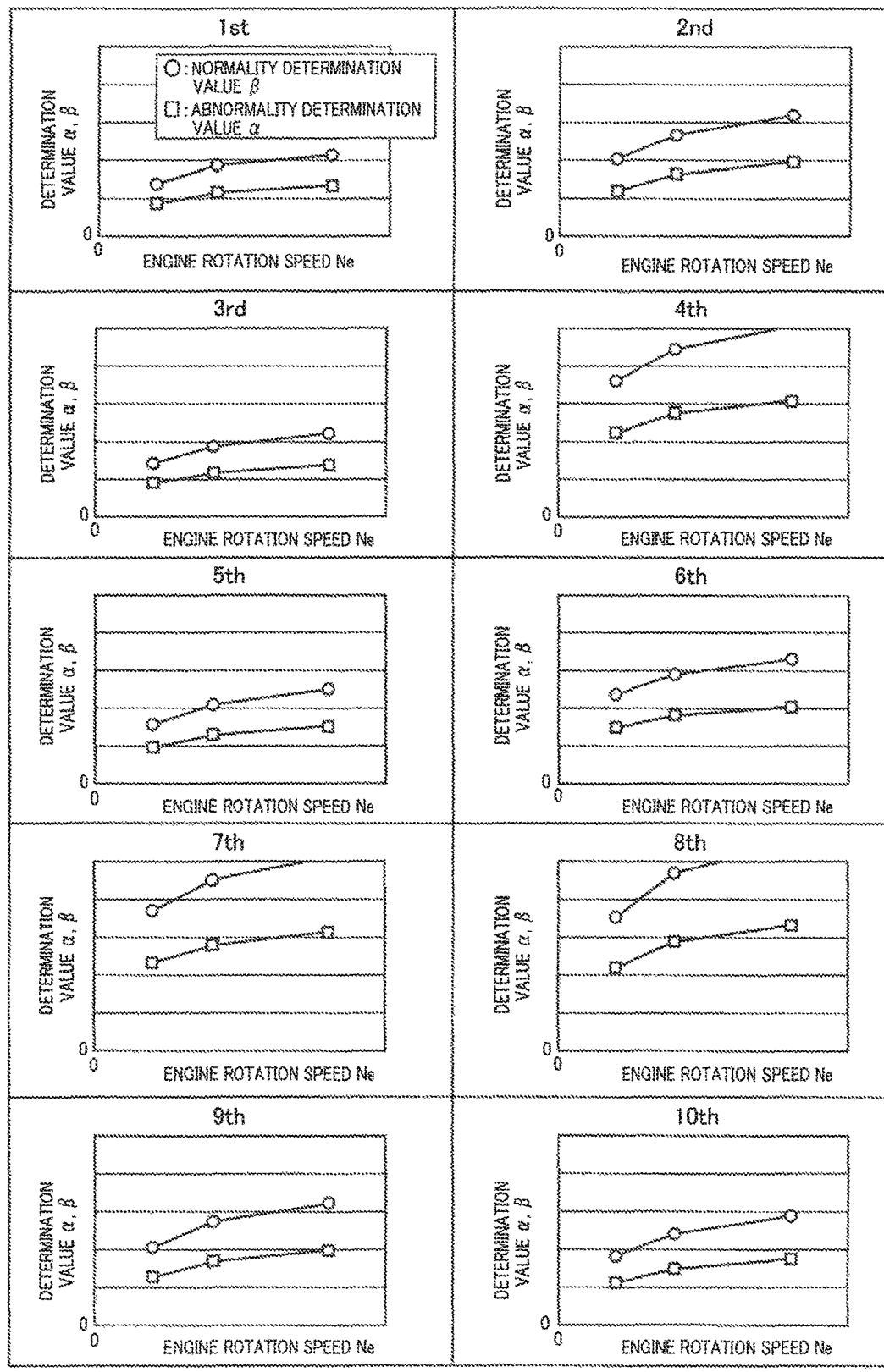
FIG. 8 is a diagram for explaining an example of the abnormality determination value $\alpha$ and the normality determination value β defined for each of the plurality of gear positions of the automatic transmission.

The minimum line pressure PLmin is output while the opening area of the discharge flow passage 45 of the primary regulator valve 44 is maximized, and therefore, when the discharge flow rate is increased in accordance with a rise in the rotation speed of the oil pump 42, i.e., the engine rotation speed Ne, the minimum line pressure PLmin tends to become higher due to a flow resistance etc. of the discharge flow passage 45 as the discharge flow rate increases. Therefore, the abnormality determination value α is also set by using the engine rotation speed Ne as a parameter as shown in FIG. 7, for example, and is defined such that the abnormality determination value α continuously becomes higher as the engine rotation speed Ne increases, and the abnormality determination of the linear solenoid valve SLT for line pressure regulation is made in the region in which the input torque Tinslp is equal to or greater than this abnormality determination value α. FIG. 8 is a diagram of an example of the abnormality determination value α defined separately for each of the gear positions, and a line indicated with marks "□" denotes the abnormality determination value α. Although the abnormality determination value α is set as a polygonal line in FIG. 8, the abnormality determination value α can nonlinearly continuously be changed in accordance with a change in the minimum line pressure PLmin as shown in FIG. 7. The abnormality determination value α as described above is stored in advance as a map in a determination value storage portion 86 of the electronic control device 80.

In contrast, the abnormality determination value α is conventionally a constant value as indicated by a dashed line of FIG. 7. Therefore, in a region A indicated by hatched lines between the dashed line and a solid line related to the abnormality determination value α, the abnormality determination is made even though the linear solenoid valve SLT for line pressure regulation is not in abnormal state, causing a problem that a time is required for identification of the failure component because of an increase in the number of components having a possibility of abnormality. Since the conventional abnormality determination value α is determined based on the lowest minimum line pressure PLmin when the engine rotation speed Ne is low, a deviation from the actual minimum line pressure PLmin increases as the engine rotation speed Ne becomes higher, resulting in a higher degree of the abnormality determination made regardless of not being abnormal.

Figure 6:
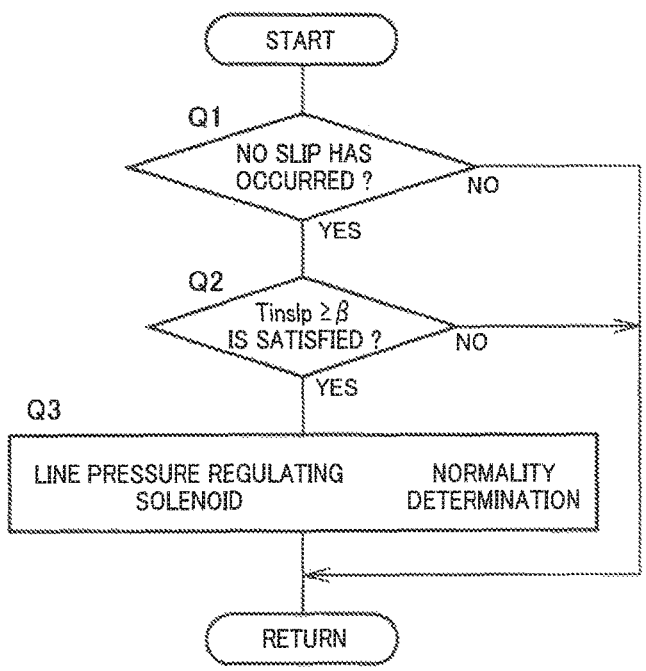
FIG. 6 is a flowchart for specifically explaining an operation of a normality determination portion functionally included in the electronic control device of FIG. 1.

On the other hand, the normality determination portion 84 executes a signal process in accordance with steps Q1 to Q3 (hereinafter simply referred to as Q1 to Q3) of a flowchart shown in FIG. 6 so as to make a normality determination indicating that the linear solenoid valve SLT for line pressure regulation is in normal state. The flowchart of FIG. 6 is executed when a predefined determination execution condition is satisfied, such as when the automatic transmission 16 is kept at any of the forward gear positions. At Q1, it is determined whether no slip has occurred in the clutches C and the brakes B for establishing the current gear position. Specifically, it may be determined whether the current actual transmission ratio γ substantially matches the theoretical transmission ratio γr and, for example, this can be determined in accordance with following Equation (2). In particular, if a difference (absolute value) is equal to or less than a predefined slip determination value Y between the input rotation speed Nin and a value (Nout*γt) obtained by multiplying the output rotation speed Nout by the theoretical transmission ratio γr of the current gear position, it can be determined that no slip has occurred, and Q2 and subsequent steps are executed. If Equation (2) is not satisfied, it is determined that a slip has occurred, and the process is simply terminated. The slip determination value Y is desirably close to zero and is appropriately determined in consideration of detection errors of sensors etc.

$$|Nin-Nout*\gamma r| \leq Y \quad (2)$$

At Q2, it is determined whether the input torque Tin at this point is equal to or greater than a predetermined normality determination value β and, in the case of Tin≥β, Q3 is executed to make the normality determination indicating that the line pressure regulating solenoid, i.e. the linear solenoid valve SLT of the line pressure regulating device 48, is normal, or in the case of Tin<β, the process is simply terminated. The input torque Tin can be calculated, as is the case with the input torque Tinslp, from the throttle valve opening degree θth of the engine 12, the engine rotation speed Ne, the torque ratio of the torque converter 14, etc. The normality determination value β is obtained as is the case with the abnormality determination value α, and a value larger than the determination reference value S is defined by multiplying the determination reference value S, which is the input torque Tin calculated from the torque transmittable by the clutch C and the brake B at the minimum line pressure PLmin, by a predetermined safety factor (e.g., about 1.1 to 1.2).

The normality determination value β is also set based on the minimum line pressure PLmin changed in accordance with the rotation speed of the oil pump 42 (the engine rotation speed Ne) by using the engine rotation speed Ne as a parameter as shown in FIG. 7, for example, and is defined such that the normality determination value β continuously becomes higher as the engine rotation speed Ne increases, and the normality determination of the linear solenoid valve SLT for line pressure regulation is made in the region in which the input torque Tin is equal to or greater than this normality determination value β. In contrast, the normality determination value β is conventionally a constant value as indicated by a dashed line of FIG. 7, and therefore, in a region B indicated by hatched lines between the dashed line and a solid line related to the normality determination value β, the normality determination is not made even though the linear solenoid valve SLT for line pressure regulation is normal, causing a problem that a time is required for identification of the failure component. Since the conventional normality determination value β is determined based on the highest minimum line pressure PLmin when the engine rotation speed Ne is high, a deviation from the actual minimum line pressure PLmin increases on the lower side of the engine rotation speed Ne, resulting in a higher degree of the normality determination not made regardless of being normal. A line indicated with marks "o" in FIG. 8 denotes an example of the normality determination value β defined separately for each of the gear positions and, although being set as a polygonal line, the normality determination value β can nonlinearly continuously be changed in accordance with a change in the minimum line pressure PLmin as shown in FIG. 7. The normality determination value β is stored in advance as a map in the determination value storage portion 86 of the electronic control device 80 as is the case with the abnormality determination value α. It is noted the determination reference value S may be stored as a map and the abnormality determination value α and the normality determination value β may be obtained by calculations based on the determination reference value S.

As described above, according to the vehicle power transmission device 10 of this example, based on the fact that when the discharge flow rate of the hydraulic fluid is increased in accordance with a rise in the rotation speed of the oil pump 42, i.e., the engine rotation speed Ne, at the time of abnormality causing the output hydraulic pressure of the line pressure regulating device 48 to be the minimum line pressure PLmin due to a failure of the linear solenoid valve SLT, the minimum line pressure PLmin tends to become higher as the discharge flow rate increases, the abnormality determination value α is defined in accordance with the engine rotation speed Ne such that the value becomes larger when the engine rotation speed Ne is high as compared to when the engine rotation speed Ne is low as shown in FIGS. 7 and 8, so that the abnormality determination of the linear solenoid valve SLT for line pressure regulation is properly made in accordance with a change in the minimum line pressure PLmin associated with the change in the engine rotation speed Ne, and therefore, the determination accuracy is improved. Particularly, since the abnormality determination value α nonlinearly continuously increases as the engine rotation speed Ne increases in accordance with the change in the minimum line pressure PLmin in FIG. 7, the abnormality determination of the linear solenoid valve SLT is made with higher accuracy. Additionally, since a value smaller than the determination reference value S obtained based on the minimum line pressure PLmin is set as the abnormality determination value α, it is prevented that the abnormality determination is not made even though the linear solenoid valve SLT has a possibility of abnormality when variations occur in the abnormality determination value α or the input torque Tinslp due to dimensional errors and aging variations of portions, detection errors of sensors, fluctuations in the engine rotation speed Ne, etc., so that the abnormality determination is made with high accuracy. In other words, the abnormality determination is reliably made at the time of abnormality of the linear solenoid valve SLT.

This reduces the possibility of making the abnormality determination even though the linear solenoid valve SLT is not abnormal, and shortens the time required for identification of the failure component. Particularly, since the ten-speed automatic transmission 16 is mounted in this example and the six linear solenoid valves SL to SL6 and the one on-off solenoid valve SC1 are included for the shift control, a large number of components are involved in the hydraulic control, and therefore, the improvement in accuracy of the abnormality determination of the linear solenoid valve SLT greatly contributes to shortening of the time for identification of the failure component.

In this example, the linear solenoid valves SL and the on-off solenoid valve SC1 are included as the shift control electromagnetic valves and, although a failure of the linear solenoid valve SL or the on-off solenoid valve SC1 may cause an abnormality interrupting the supply of the line pressure PL to the clutch(es) C and the brake(s) B, when the input torque Tinslp at the time of occurrence of a slip is lower than the abnormality determination value α, the abnormality determination is made for the linear solenoid valve SL and the on-off solenoid valve SC1 for the shift control involved in the current gear position. Therefore, by defining the abnormality determination value α in accordance with the engine rotation speed Ne, the abnormality determination of the linear solenoid valve SLT for line pressure regulation is properly excluded, which facilitates the identification of abnormal components including the linear solenoid valve SL and the on-off solenoid valve SC1 for the shift control.

The normality determination portion 84 is included in this example and the normality determination of the linear solenoid valve SLT for line pressure regulation is made if no slip is detected in the clutch(es) C or the brake(s) B even when the input torque Tin is equal to or greater than the predefined normality determination value β and, since the normality determination value β is determined, as is the case with the abnormality determination value α, in accordance with the engine rotation speed Ne as shown in FIGS. 7 and 8 and based on the minimum line pressure PLmin changed depending on the engine rotation speed Ne, the normality determination of the linear solenoid valve SLT is properly made in accordance with the change in the minimum line pressure PLmin associated with the change in the engine rotation speed Ne, so that the determination accuracy is improved. Particularly, since the normality determination value β nonlinearly continuously increases in FIG. 7 in accordance with the change in the minimum line pressure PLmin as the engine rotation speed Ne rises, so that the normality determination of the linear solenoid valve SLT is made with higher accuracy. Additionally, since a value larger than the determination reference value S obtained based on the minimum line pressure PLmin is set as the normality determination value β, the normality determination is prevented from being made even though the linear solenoid valve SLT has a possibility of not being normal when variations occur in the normality determination value β or the input torque Tin due to dimensional errors and aging variations of portions, detection errors of sensors, fluctuations in the engine rotation speed Ne, etc., so that the normality determination is made with high accuracy. In other words, the normality determination is reliably prevented from being made at the time of abnormality of the linear solenoid valve SLT.

This reduces the possibility of not making the normality determination even though the linear solenoid valve SLT is normal, and shortens the time required for identification of the failure component. Particularly, since the ten-speed automatic transmission 16 is mounted in this example and the six linear solenoid valves SL1 to SL6 and the on-off solenoid valve SC1 are included for the shift control, a large number of components are involved in the hydraulic control, and therefore, the improvement in accuracy of the normality determination of the linear solenoid valve SLT greatly contributes to shortening of the time for identification of the failure component.

In this example, the automatic transmission 16 capable of establishing the ten forward speed gear positions with the clutches C1 to C4 and the brakes B1, B2 is included and, since the abnormality determination value α and the normality determination value β are set separately for each of the gear positions as shown in FIG. 8, the abnormality determination and the normality determination of the linear solenoid valve SLT for line pressure regulation are properly made regardless of differences in torque characteristics of the clutches C1 to C4 and the brakes B1, B2.

Although the examples of the present invention have been described in detail with reference to the drawings, this is merely an embodiment and the present invention can be implemented in variously modified and improved forms based on the knowledge of those skilled in the art.

REFERENCE SIGNS LIST

10: Vehicle power transmission device 16: Automatic transmission 40: Hydraulic control circuit 42: Oil pump 45: Discharge flow passage 48: Line pressure regulating device 80: Electronic control device 82: Abnormality determination portion 84: Normality determination portion 86: Determination value storage portion C1 to C4: Clutch (Hydraulic friction engagement element) B1, B2: Brake (Hydraulic friction engagement element) SL1 to SL6: Linear solenoid valve (Shift control electromagnetic valve) SC1: On-off solenoid valve (Shift control electromagnetic valve) PL: Line pressure Ne: Engine rotation speed (Rotation speed of the oil pump) Tin: Input torque Tinslp: Input torque at the time of occurrence of a slip of the hydraulic friction engagement element α: Abnormality determination value β: Normality determination value S: Determination reference value

What is claimed is:
1. A control device of a vehicle power transmission device for the vehicle power transmission device including a line pressure regulating device regulating a hydraulic pressure of a hydraulic fluid discharged from an oil pump to a predetermined line pressure while changing an opening area of a discharge flow passage, and an automatic transmission having a predetermined gear position established by engagement of a hydraulic friction engagement element by using the line pressure as a source pressure, the control device comprising:

a processor configured to:
  determine whether a slip has occurred in the hydraulic friction engagement element establishing the predetermined gear position at a time of establishment of the predetermined gear position;
  when it is determined that the slip has occurred, determine whether an input torque at a time of occurrence of the slip is equal to or greater than an abnormality determination value defined in advance based on a torque transmittable at a minimum line pressure by the hydraulic friction engagement element establishing the predetermined gear position; and
  when the input torque is equal to or greater than the abnormality determination value, make an abnormality determination indicative of a possibility of an abnormality causing an output hydraulic pressure of the line pressure regulating device to be the minimum line pressure while the opening area of the discharge flow passage is maximized, wherein
the abnormality determination value is defined in accordance with a rotation speed of the oil pump such that the abnormality determination value becomes larger when the rotation speed is high as compared to when the rotation speed is low.

2. The control device of a vehicle power transmission device according to claim 1, wherein
the automatic transmission includes a shift control electromagnetic valve controlling a hydraulic pressure supplied to the hydraulic friction engagement element, and wherein
the processor is further configured to, when the input torque at the time of occurrence of the slip is lower than the abnormality determination value, make an abnormality determination indicative of a possibility of an abnormality interrupting the supply of the hydraulic pressure to the hydraulic friction engagement element due to a failure of the shift control electromagnetic valve.

3. The control device of a vehicle power transmission device according to claim 2, wherein the processor is further configured to:
  determine whether no slip has occurred in the hydraulic friction engagement element establishing the predetermined gear position at the time of establishment of the predetermined gear position;
  when it is determined that no slip has occurred, determine whether an input torque is equal to or greater than a normality determination value defined in advance based on a torque transmittable at the minimum line pressure by the hydraulic friction engagement element establishing the predetermined gear position; and
  when the input torque is equal to or greater than the normality determination value, make a normality determination indicating that the line pressure regulating device is normal, wherein
the normality determination value is defined in accordance with a rotation speed of the oil pump such that the normality determination value becomes larger when the rotation speed is high as compared to when the rotation speed is low, and wherein
the normality determination value is set to a value larger than a determination reference value corresponding to an input torque value transmittable at the minimum line pressure by the hydraulic friction engagement element establishing the predetermined gear position, while the abnormality determination value is set to a value smaller than the determination reference value.

4. The control device of a vehicle power transmission device according to claim 3, wherein
the automatic transmission includes a plurality of hydraulic friction engagement elements engaged by using the line pressure as a source pressure and establishes each of a plurality of gear positions different in transmission ratio in accordance with a difference in combination of engagement and release states of the plurality of hydraulic friction engagement elements, and wherein
the abnormality determination value is defined separately for each of the plurality of gear positions.

5. The control device of a vehicle power transmission device according to claim 2, wherein
the automatic transmission includes a plurality of hydraulic friction engagement elements engaged by using the line pressure as a source pressure and establishes each of a plurality of gear positions different in transmission ratio in accordance with a difference in combination of engagement and release states of the plurality of hydraulic friction engagement elements, and wherein
the abnormality determination value is defined separately for each of the plurality of gear positions.

6. The control device of a vehicle power transmission device according to claim 1, wherein the processor is further configured to:
  determine whether no slip has occurred in the hydraulic friction engagement element establishing the predetermined gear position at the time of establishment of the predetermined gear position;
  when it is determined that no slip has occurred, determine whether an input torque is equal to or greater than a normality determination value defined in advance based on a torque transmittable at the minimum line pressure by the hydraulic friction engagement element establishing the predetermined gear position; and
  when the input torque is equal to or greater than the normality determination value, make a normality determination indicating that the line pressure regulating device is normal, wherein
the normality determination value is defined in accordance with a rotation speed of the oil pump such that the normality determination value becomes larger when the rotation speed is high as compared to when the rotation speed is low, and wherein
the normality determination value is set to a value larger than a determination reference value corresponding to an input torque value transmittable at the minimum line pressure by the hydraulic friction engagement element establishing the predetermined gear position, while the abnormality determination value is set to a value smaller than the determination reference value.

7. The control device of a vehicle power transmission device according to claim 6, wherein
the automatic transmission includes a plurality of hydraulic friction engagement elements engaged by using the line pressure as a source pressure and establishes each of a plurality of gear positions different in transmission ratio in accordance with a difference in combination of engagement and release states of the plurality of hydraulic friction engagement elements, and wherein
the abnormality determination value is defined separately for each of the plurality of gear positions.

8. The control device of a vehicle power transmission device according to claim 1, wherein
the automatic transmission includes a plurality of hydraulic friction engagement elements engaged by using the line pressure as a source pressure and establishes each of a plurality of gear positions different in transmission ratio in accordance with a difference in combination of engagement and release states of the plurality of hydraulic friction engagement elements, and wherein
the abnormality determination value is defined separately for each of the plurality of gear positions.

* * * * *